June 1, 1943.   R. LANG   2,320,618
ROLLER BEARING
Filed Aug. 30, 1940   2 Sheets-Sheet 1

Inventor:
Richard Lang

By Edmund H. Parry Jr.
Attorney

June 1, 1943.  R. LANG  2,320,618
ROLLER BEARING
Filed Aug. 30, 1940  2 Sheets-Sheet 2

Inventor:
Richard Lang
By Edmund H. Parry
Attorney

Patented June 1, 1943

2,320,618

UNITED STATES PATENT OFFICE 2,320,618

ROLLER BEARING

Richard Lang, Ravensburg, Germany; vested in the Alien Property Custodian

Application August 30, 1940, Serial No. 354,898
In Germany August 31, 1939

3 Claims. (Cl. 308—217)

My invention relates to roller bearings and has special reference to bearings of this kind which rotate not only around their own centre but again around another centre, as for example the crank bearing in the rotating end of a connecting rod in engines. It is of special importance in fast running engines such as internal combustion engines of high strain in which such bearings have to endure considerable centrifugal forces.

Normally such cages are supported only by one or two of the rollers when rotating. Consequently, these few rollers have to endure the entire centrifugal force resulting from the rotation. It is also necessary to guide the cages at other parts of such bearings. The centrifugal force deforms the cages so that the individual rollers are constantly displaced and have to suffer from additional wear.

According to my invention these disadvantages are avoided by dividing the cage into a plurality of individual portions extending over an arc of the circumference only. Every portion should include only a comparatively small number of rollers and such cage portions should be in immediate touch with one another. In certain cases it may be advisable to provide three or four portions only, whereas in other cases a greater number of shorter portions extending over two or three rollers only may be preferable. Thus, the construction of the bearing is considerably simplified and rendered cheaper.

Furthermore I prefer to give the cage and its portions such shape that the rollers are guided only outside of the breadth of their race ways; thereby the wear of the rollers resulting from the friction with the cage portions is limited to the ends of the rollers. This is of special importance in connection with the divided cage structure because both features together bring the advantage that the rollers on their cylindrical surface are not any more unduly injured and worn out because of the above mentioned circumstances but run only under normal wear conditions conform to their design and construction. Thus the safety of working, especially under higher strain, is immensely increased and the working life of the rollers is much longer.

Having given a general description of my invention I now want to point it out more in detail having reference to the drawings which represent examples embodying my invention.

Figs. 1, 2A, 2B and 3 represent one embodiment, whereas

Figs 1 and 4 are vertical sections through a crank bearing, taken along lines A—A and D—D of Figs. 2 and 5, respectively.

Fig. 2A is an end view partly in section of the left half of a bearing taken on the section line B—B of Fig. 1.

Fig. 2B is an end view partly in section of the right half of the bearing shown in Fig. 2A taken on the section line C—C of Fig. 1.

Fig. 5A is an end view partly in section of the left half of a bearing taken on the section line E—E of Fig. 4.

Fig. 5B is an end view partly in section of the right half of the bearing shown in Fig. 5 taken on the section line F—F of Fig. 4.

Figures 2A, 2B:
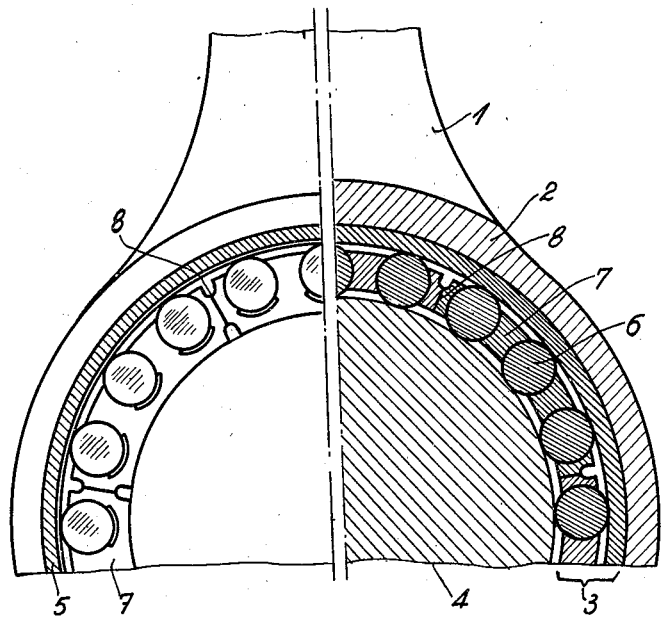
Figure 3:
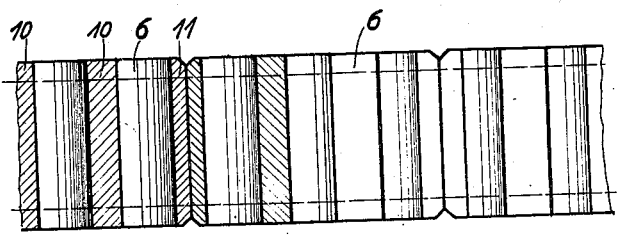

Fig. 3 in its left hand portion is a part of a circular section along the circle line of the roller centres, as shown in Fig. 2, but only the cage portions being cut, whereas the rollers are shown in view; the right hand portion of Fig. 3 shows a view on the cage portions and the rollers, the outer race way assumed to be removed.

Figure 6:
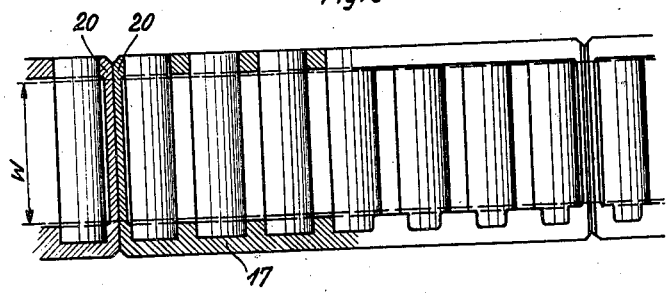

Fig. 6 corresponds to Fig. 3 but represents the second modification.

Figure 1:
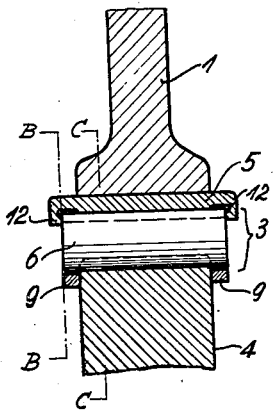

In the first example (Figs. 1 to 3) a connecting rod 1 at its end is shaped into an eye 2 into which the roller bearing 3 for journaling the crank 4 is inserted. This bearing comprises an outer race way 5, rollers 6, and a plurality of arcuate segmental cage portions 7 which together constitute a circular cage. The cage portions 7 abut against each other at 8; they consist of side portions 9 having roller receiving cut-outs. The side portions are located at the opposite ends of the rollers 6 and are connected by links or studs 10 and end pieces 11. The end pieces of the adjacent cage portions abut as shown in Fig. 3. The outer race way 5 is provided with collars 12 overlying the ends of rollers 6 which serve for guiding the rollers 6 and the cage portions 7.

Figure 4:
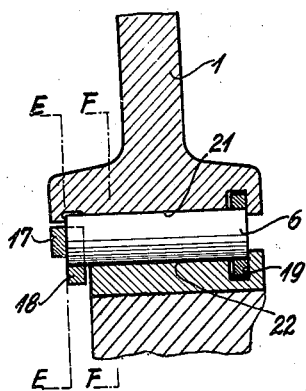
Figs. 4, 5A, 5B and 6 show a second embodiment.
Figures 5A, 5B:
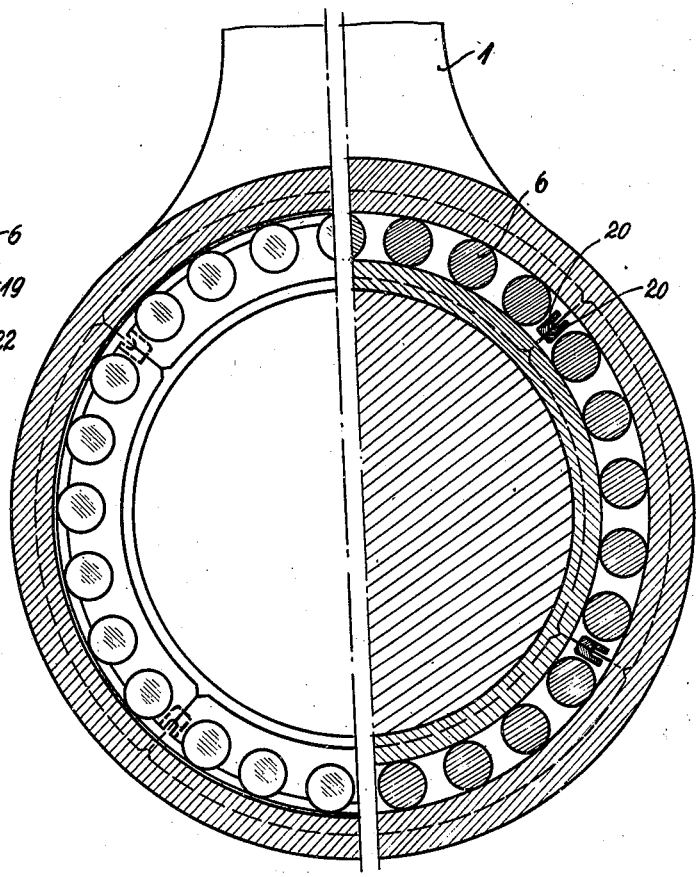

In the second modification as represented in Figs. 4 to 6, the rollers 6 of the bearing are held in cage portions 17 which are provided with opposite side portions 18 and 19 without connecting links between every two rollers, as in the first example, but having only connecting end pieces 20. These end pieces 20 are so shaped that they are not in touch with the adjacent roller; but the outside of every endpiece abuts the endpiece of the adjacent cage portion. The rollers 6 are in touch with the outer and inner race ways 21 and 22, respectively, over the breadth $w$ only, while their outer end portions are received in the cut-out portions in the side portions 18 and 19 of the cage portions 17 which serve for guiding the rollers. Consequently, the bearing surfaces are not injured by the wear occurring on the guiding surfaces.

I do not want to be limited to the details described or shown in the drawings as variations will occur to those skilled in the art without deviating from the scope of my invention.

What I claim is:

1. A roller bearing comprising an outer race way, an inner race way, rollers disposed between and in rolling engagement with the outer and inner race ways, and a cage for the rollers formed as a plurality of individual arcuate segments, each cage segment having spaced side portions formed with individual recesses receiving and contacting the opposite ends of one group of the rollers, the side portions of the cage segments contacting the rollers only in portions of the roller surfaces which do not contact either of the raceways, and axially extending end members interconnecting the side portions, the end members of adjacent cage segments being disposed in abutting relation.

2. A roller bearing comprising concentric relatively rotatable outer and inner members, a separate sleeve fitted in one of said members and forming a race way therefor, an opposing race way in the other member, roller bearings disposed between the outer and inner race ways in bearing engagement therewith, and a cage for the rollers separate from the sleeve formed as a plurality of arcuate segments, each segment having spaced interconnected side portions formed with individual recess receiving and contacting the opposite ends of one group of the rollers, the side portions of the cage segments contacting the rollers only in portions of the roller surfaces which do not contact either of the raceways.

3. A roller bearing comprising an outer raceway, an inner raceway, substantially cylindrical rollers in between said raceways, a cage structure for said rollers, said cage in its circumference being subdivided into a plurality of individual portions abutting each other, each of said cage portions serving for guiding a number of said rollers, said cage portions being in touch with said rollers only over such portions of their circumference which when rotating do not get into contact with either of said raceways for said rollers.

RICHARD LANG.